United States Patent [19]
Liechti

[11] Patent Number: 4,889,431
[45] Date of Patent: Dec. 26, 1989

[54] MIXING KNEADER WITH KNEADING FORKS

[75] Inventor: Pierre Liechti, Muttenz, Switzerland

[73] Assignee: List AG, Pratteln, Switzerland

[21] Appl. No.: 234,900

[22] Filed: Aug. 22, 1988

[30] Foreign Application Priority Data

Aug. 28, 1987 [CH] Switzerland .................. 03322/87

[51] Int. Cl.⁴ ............................................. B01F 7/04
[52] U.S. Cl. ................................... 366/99; 366/149; 366/303; 366/307; 366/309
[58] Field of Search ................ 366/302–304, 366/307, 309, 311, 312, 313, 315, 292, 317, 293, 325, 144, 99, 149, 96–98; 241/243, 228; 99/348; 422/225

[56] References Cited

U.S. PATENT DOCUMENTS

| | | | |
|---|---|---|---|
| 1,585,169 | 5/1926 | Perkins et al. | 366/303 |
| 1,870,980 | 8/1932 | Altwegg | 366/303 X |
| 3,182,633 | 5/1965 | Lodige et al. | 366/307 X |
| 3,880,407 | 4/1975 | List | 366/99 |
| 4,650,338 | 3/1987 | List et al. | 366/307 X |
| 4,775,243 | 10/1988 | Baumgartner | 366/313 X |

Primary Examiner—Timothy F. Simone
Attorney, Agent, or Firm—Bachman & LaPointe

[57] ABSTRACT

Heatable or coolable mixing kneader for batchwise or continuous operation for mixing/kneading processes with liquid, pasty and free-flowing products, with a kneading shaft (16) coaxially rotating in a cylindrical housing (1), with disk elements (17) mounted at right angles thereupon, with kneading bars (18), which interest with kneading counterelements (19/20/21) fixed in the housing, characterized in that these kneading tools are designed as interengaging forks with kneading gaps of large specific length.

16 Claims, 4 Drawing Sheets

MIXING KNEADER WITH KNEADING FORKS

BACKGROUND OF THE INVENTION

The invention relates to a mixing kneader for the mechanical and/or thermal treatment of products in liquid, pasty and free-flowing states.

Mixing kneaders of this type for batchwise or continuous operation are known, for example, from DE-PS No. 2,349,106 C3. Although these mixing kneaders are very robust, in the case of some products which have a tendency for agglomerations to build up on the kneading counterelements, the process is greatly slowed.

SUMMARY OF THE INVENTION

The subject of the invention eliminates these difficulties and has proved very advantageous for the processing of difficult products, since the kneading tools, which there engage with one another in comb-like manner and are distributed over the entire kneading space, improve the mixing and kneading action and prevent the buildup of product on the kneading counterelements due to the shearing action into the lengthened kneading gaps.

BRIEF DESCRIPTION OF THE DRAWINGS

The invention is explained in more detail with reference to drawings, in which.

DETAILED DESCRIPTION

Figure 1:
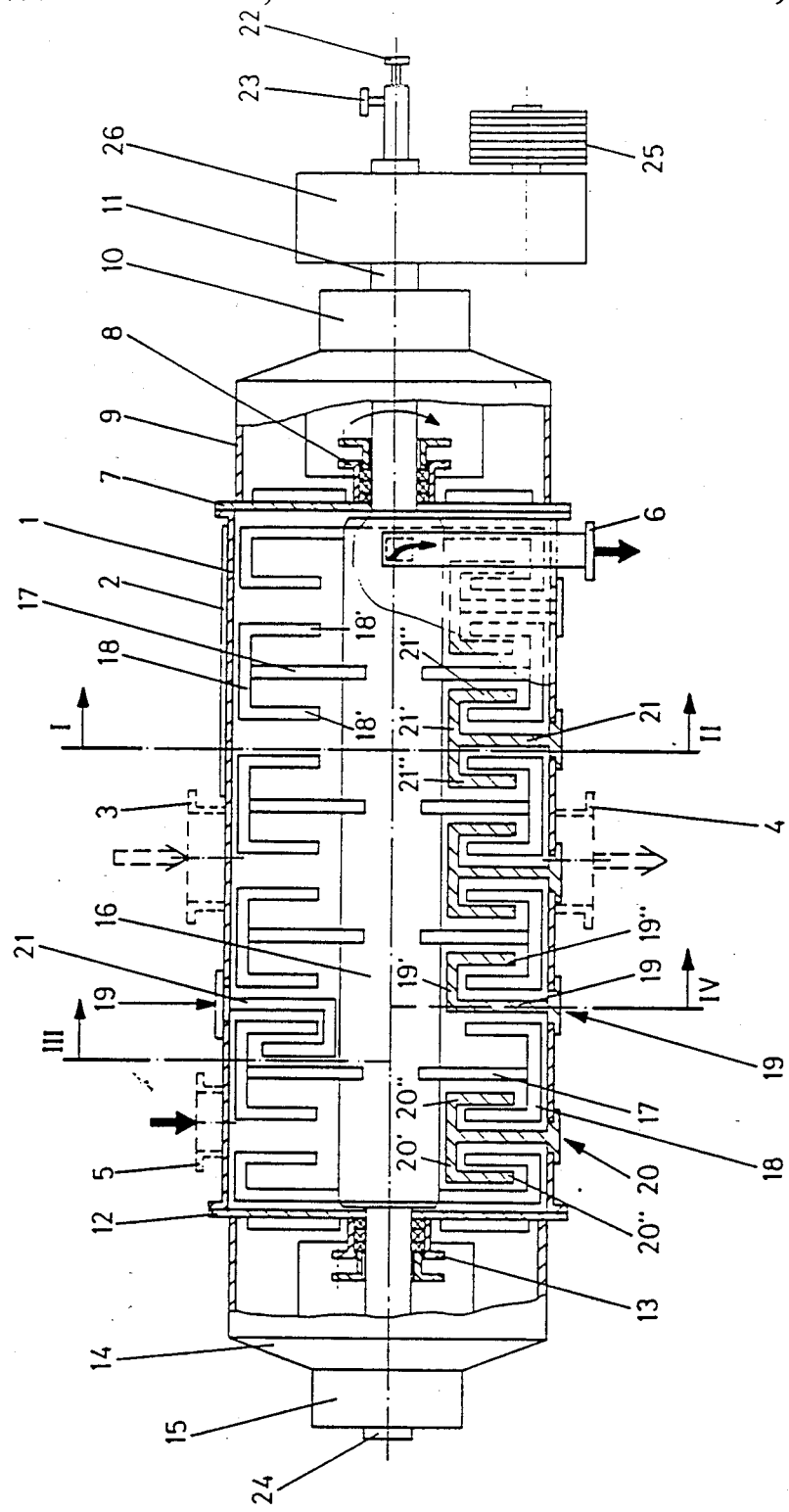
FIG. 1 shows a longitudinal section through the mixing kneader.

FIG. 1 shows the basic design of the mixing kneader for continuous operation.

The housing 1 is provided with a heating jacket or heating channels 2. The metering of the initial product in continuous operation takes place via one or more nozzle 5, the discharge takes place via a lateral nozzle with discharge channel 6. For feeding with the initial product in batchwise operation, one or more nozzles 3 are arranged. Emptying takes place at the lower nozzle 4. The nozzles 3 serve in batchwise or in continuous operation at the same time for the extraction of waste vapors. The end wall 7 is equipped with the stuffing box 8 and with the skirt 9 for supporting the bearing 10 for the kneading shaft journal 11. The end wall 12 with the stuffing box 13, skirt 14 and bearing 15 on the axially opposite side are designed similarly.

In the bearings 10 and 15, the central kneading shaft 16 is supported by the shaft journals 11 and 24 and is driven by a drive motor (not shown here) via the V-belt pulley 25 and a slip-on gear 26.

The shaft 16 with the disks 17 is heatable or coolable, the supplying of the heat transfer medium taking place through nozzle 22 and the return taking place through nozzle 23 of a known metering head with mechanical seals.

The kneading bars 18 are fixed on the outer diameter of the heatable or coolable disk elements 17. Each kneading bar consists of an approximately axial arm 18 along the housing wall and of the attached radial kneading disks 18', which extend inwards as far as possible and with the disks 17 form radially co-rotating shearing gaps. Into each of these shearing gaps engage stationary radial kneading counterelements 19", 20", 21", which are fixed in the housing 1 by radial carrier arms 19, 20, 21 via the arm 19', 20', 21' arranged approximately axial along the kneading shaft.

The part of the kneading bars 18 running close by the housing 1 assumes the cleaning of the housing 1. The parts 19', 20', 21' arranged close to the kneading shaft 16 and the disk elements 17 undertake the cleaning of the kneading shaft, the radial kneading counterelements 19", 20", 21" clean the disk surfaces 17 and act together with the support feet 19, 20, 21 as baffle with respect to the rotating kneading bars 18 and 18' circulating the product.

Particularly in the case of pastes, when the rotating radial parts of the kneading bars 18 and 18' engage with the radial parts of the static kneading counterelements 19", 20", 21", great shearing forces are exerted on the product. The shearing gaps distributed over the entire area of the kneading space between the disks ensure that the powerful movement of material initiated by the shearing forces to a great extent prevents a build-up of the product.

Figure 2:
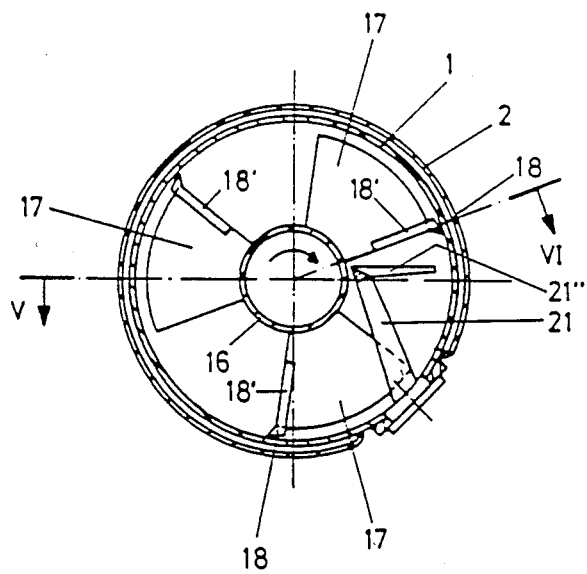
FIG. 2 shows a cross-section through the mixing kneader along line of intersection I–II of FIG. 1.

FIG. 2 shows the shearing engagement of the radial arms 18', of the rotating kneading bars 18 with the radial arms 21 and 21" of the static kneading counterelements.

Figure 3:
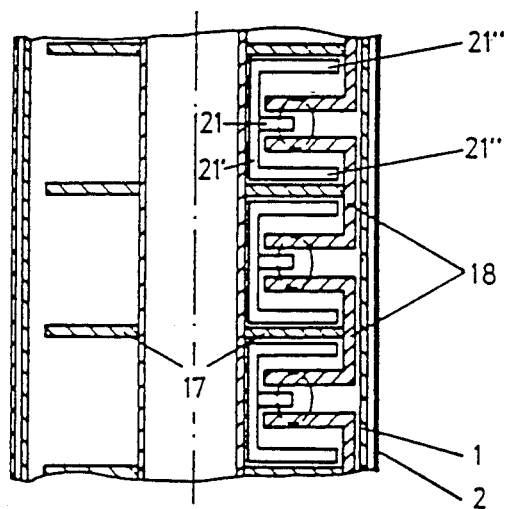
FIG. 3 shows a partial longitudinal section along line of intersection V–VI of FIG. 2.

In FIG. 3, the long kneading gaps produced by this arrangement of the kneading tools is evident. The static radial support feet 21, shown in FIG. 3 and in FIG. 5, can only be seen in shortened form due to the oblique position.

Figure 4:
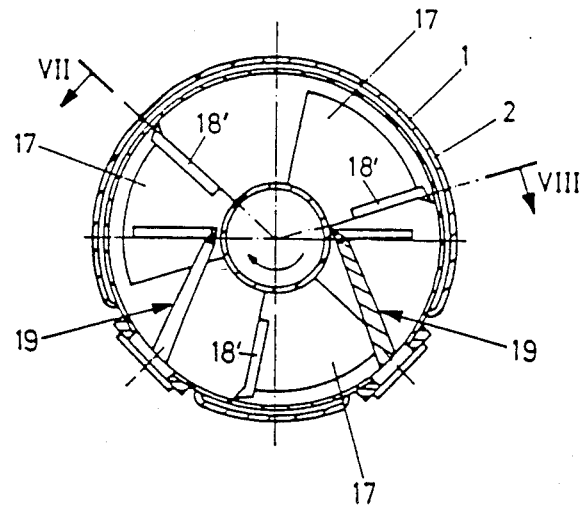
FIG. 4 shows a cross-section along line of intersection III–IV of FIG. 1.

FIG. 4 shows an embodiment with kneading counterelements 19, 19', and 19" only formed on one side, here arranged along two axially parallel surface lines of the housing 1.

Figure 5:
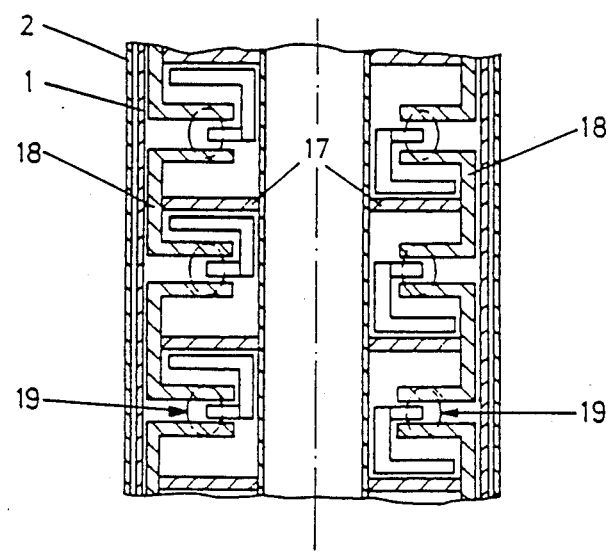
FIG. 5 shows a partial longitudinal section along line of intersection VII–VIII of FIG. 4.

In the partial longitudinal section of FIG. 5 associated with FIG. 4, it can be seen that, with the one-sided embodiment of the kneading counterelements, in each case two opposite mirror-inverted kneading counterelements are necessary between two neighboring disk elements 17 in order to clean both disk surfaces. Consequently, on the one hand the cleaning of the disks 17 and of the kneading shaft 16 in such a kneading space is divided over two tools, on the other hand more kneading gaps are formed specifically by the additional support foot of the additional kneading counterelement, the division over two kneading counterelements also having a positive effect on the force distribution in the case of highly viscous products.

Normally, the kneading bars 18 are attached to the front edges, seen in the direction of movement, of the disk elements 17. However, it has been found that the kneading bars can also be fixed to the rear edge of the disk elements or between front and rear edges, in order to distribute the force peaks better over a revolution of the kneading shaft.

The force peaks may also be better distributed by the radial kneading elements and kneading counterelements being bent in the radial planes, so that a shear-like effect is produced when they pass through one another.

Figure 6:
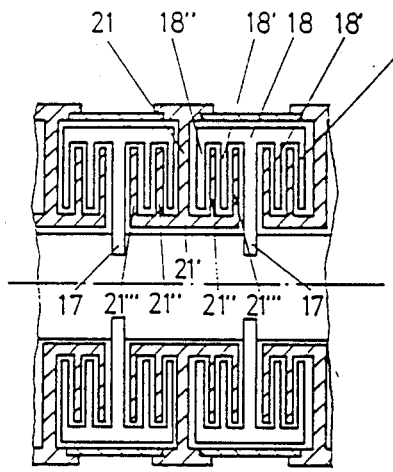
FIG. 6 shows a partial longitudinal section through the kneading space with kneading bars and kneading counterelements, which are designed as twin forks.

FIG. 6 shows a variant in which the rotating kneading bars 18 are provided with additional rotating radial kneading elements 18″. Similarly, the associated stationary kneading counterelements 21 have additional kneading arms 21‴ between two disk surfaces. This arrangement allows ten kneading gaps between two disk surfaces, instead of only six in the previous figures.

A further increase in the mixing and kneading effect is produced by a greater number of kneading counterelements which are distributed correspondingly around the circumference of the kneading space between the disk surfaces.

Both the elements 18′ and the kneading counterelements 19″, 20″, 21″ or the arm 19, 20, 21 are normally arranged radially. However, they may also be arranged radially inclined, so that radially inclined kneading gaps are also produced.

I claim:

1. Batchwise or continuously operating mixing kneader for treatment of products, which comprises: a circular-cylindrical housing having housing walls and a longitudinal axis; a kneading shaft mounted in said housing and running coaxial to the housing axis; disk elements mounted on said shaft perpendicular thereto, said disk elements having an outer diameter; co-rotating kneading bars fixed on said outer diameter including arms arranged adjacent said housing walls and at least one radial element fixed to said arms and extending towards the kneading shaft, wherein said disk elements and kneading bars form a plurality of radially co-rotating shearing gaps; and radial carrier arms fixed in the housing wall, support arms carried by said radial carrier arms and running axially along said kneading shaft, and fixed kneading counterelements carried by said support arms and engaging said shearing gaps.

2. Mixing Kneader according to claim 1 wherein the arms of the kneading bars and the support arms carried by the radial carrier arms run approximately axially and approximately parallel to the housing walls.

3. Mixing kneader according to claim 1 wherein the co-rotating kneading bars are mounted axially on one side on the disk elements.

4. Mixing kneader according to claim 1 wherein the radial carrier arms, support arms and fixed kneading counterelements have a U-shaped formation.

5. Mixing kneader according to claim 1 wherein the co-rotating kneading bars are mounted symmetrically on two sides of the disk elements.

6. Mixing kneader according to claim 1 wherein the fixed kneading counterelements are designed symmetrically with approximately radial arms on two sides of the radial carrier arms.

7. Mixing kneader according to claim 1 wherein the combination of the kneading bars and of the kneading counterelements are combined with each other in a symmetrical arrangement.

8. Mixing kneader according to claim 1 wherein the combination of the kneading bars and of the kneading counterelements are combined with each other in a one-sided arrangement.

9. Mixing kneader according to claim 1 wherein the arms of the kneading bars are arranged on the outside diameter of the disk elements and are arranged at a given point on said outside diameter.

10. Mixing kneader according to claim 1 wherein the radial elements of the kneading bars and the kneading counterelements are bent in a radial stirring plane.

11. Mixing kneader according to claim 1 wherein said housing includes heating means.

12. Mixing kneader according to claim 1 wherein said housing includes at least one inlet nozzle and at least one outlet nozzle.

13. Mixing kneader according to claim 1 wherein said housing includes means for removal of gases.

14. Mixing kneader according to claim 1 including means for supplying and removing a heat transfer medium to and from said kneading shaft.

15. Mixing kneader according to claim 1 wherein said fixed kneading counterelements extend into said shearing gaps.

16. Mixing kneader according to claim 1 wherein the arms of the kneading bars cooperate with the housing to clean the housing, the support arms of the radial carrier arms cooperate with the kneading shaft to clean the kneading shaft, and the kneading counterelements cooperate with the disk elements to clean the disk elements.

* * * * *